(12) United States Patent
Leleannec et al.

(10) Patent No.: US 11,146,790 B2
(45) Date of Patent: Oct. 12, 2021

(54) REDUCING REDUNDANCY BETWEEN TREE TYPES

(71) Applicant: INTERDIGITAL VC HOLDINGS, INC., Wilmington, DE (US)

(72) Inventors: Fabrice Leleannec, Cesson-Sevigne (FR); Tangi Poirier, Cesson-Sevigne (FR); Gagan Rath, Cesson-Sevigne (FR); Fabrice Urban, Cesson-Sevigne (FR)

(73) Assignee: INTERDIGITAL VC HOLDNGS, INC., Wilmington, DE (US)

( * ) Notice: Subject to any disclaimer, the term of this patent is extended or adjusted under 35 U.S.C. 154(b) by 36 days.

(21) Appl. No.: 16/497,565

(22) PCT Filed: Mar. 23, 2018

(86) PCT No.: PCT/EP2018/057490
§ 371 (c)(1),
(2) Date: Sep. 25, 2019

(87) PCT Pub. No.: WO2018/177947
PCT Pub. Date: Oct. 4, 2018

(65) Prior Publication Data
US 2021/0105472 A1     Apr. 8, 2021

(30) Foreign Application Priority Data

Mar. 27, 2017 (EP) ..................... 17305349

(51) Int. Cl.
*H04N 19/122* (2014.01)
*H04N 19/119* (2014.01)
(Continued)

(52) U.S. Cl.
CPC ............. *H04N 19/122* (2014.11); *G06T 9/40* (2013.01); *H04N 19/119* (2014.11); *H04N 19/176* (2014.11); *H04N 19/70* (2014.11)

(58) Field of Classification Search
CPC .. H04N 19/122; H04N 19/119; H04N 19/176; G06T 9/04
(Continued)

(56) References Cited

U.S. PATENT DOCUMENTS

2017/0272750 A1* 9/2017 An ........................ H04N 19/147
2018/0103268 A1* 4/2018 Huang ................... H04N 19/91

OTHER PUBLICATIONS

JVET Meeting; Oct. 15, 2016-Oct. 21, 2016; Chengdu; (The Joint Video Exploration Team of ISO/IEC JTC1/SC29/WG11 and ITU-TSG.16 ); URL: http://phenix.int-evry.fr/jvet/, No. JVET-D0117-v3, Oct. 20, 2016 (Oct. 20, 2016), XP030150367 (Year: 2016).*

(Continued)

*Primary Examiner* — Amir Shahnami
(74) *Attorney, Agent, or Firm* — Ronald Kolczynski

(57) ABSTRACT

An improvement in coding efficiency is achieved through restrictions on successive divisions of asymmetric splitting in advanced video coding algorithms, which frequently rely on splitting of a block of video data prior to coding using several transform sizes. Successive divisions of asymmetric splitting are forbidden if an equivalent split can be attained using triple splitting. In an embodiment, a video block is split using successive splits, but the second type of split is dependent on the first type of split.

16 Claims, 21 Drawing Sheets

(51) Int. Cl.
*H04N 19/176* (2014.01)
*G06T 9/40* (2006.01)
*H04N 19/70* (2014.01)

(58) Field of Classification Search
USPC .......................................................... 375/240
See application file for complete search history.

(56) References Cited

OTHER PUBLICATIONS

Li et al., Multi-type-tree, JVET of ITU-T SG 16 WP 3 and ISO/IEC JTC 1/SC 29/WG 11, 4th Meeting, Chengdu, CN, Oct. 15-21, 2016.
Suehring et al., JVET Common Test Conditions and Software Reference Configurations, JVET of ITU-T SG16 WP3 and ISO/IEC JTC1/SC29/WG11 2nd Meeting: San Diego, USA, Feb. 20-26, 2016.
High Efficiency Video Coding, Series H: Audiovisual and Multimedia Systems Infrastructure of Audiovisual Services—Coding of Moving Video, ITU-T Telecommunication Standardization Sector of ITU, H.265 (Apr. 2015).
Le Leannec et al., Asymmetric coding units in QTBT, JVET of ITU-T SG 16 WP 3 and ISO/IEC JTC 1/SC 29/WG 11 4th Meeting, Chengdu, CN, Oct. 15-21, 2016.
An, et al., Block partitioning structure for next generation video coding, ITU-T Draft; Study Period 2013-2016, International Telecommunication Union. Geneva, vol. 6/16, Sep. 29, 2015, pp. 1-8.
Liu et al., Remove partition size NxN, JCT-VC of ITU-T SG16 WP3 and ISO/IEC JTC1/SC29/WG11 4th meeting: Daegu, KR, Jan. 20-28, 2011.
Chen et al., Algorithm Description of Joint Exploration Test Model 3, Joint Video Exploration Team (JVET) of ITU-T SG WP 3 and ISO/IEC JTC 1/SC 29/WG 11, 3rd Meeting: Geneva, CH, May 26-Jun. 1, 2016.

\* cited by examiner

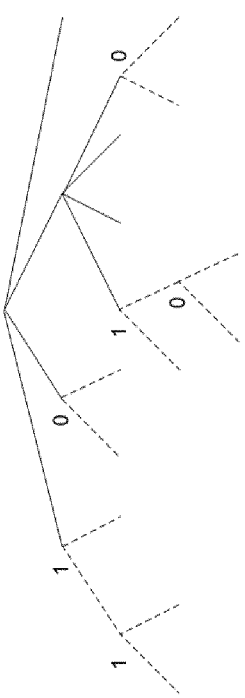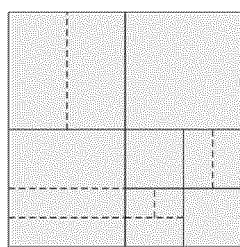
Figure 4

REDUCING REDUNDANCY BETWEEN TREE TYPES

FIELD OF THE INVENTION

The present principles relate to the field of video compression.

BACKGROUND OF THE INVENTION

In the HEVC video compression standard (International Telecommunication Union, ITU-T H.265 High Efficiency Video Coding), a picture is divided into so-called Coding Tree Units (CTU), whose size is typically 64×64, 128×128, or 256×256 pixels.

Each CTU is represented by a Coding Tree in the compressed domain. This is a quad-tree division of the CTU, where each leaf is called a Coding Unit (CU), as shown in FIG. 1.

Each CU is then given some Intra or Inter prediction parameters (Prediction Info). To do so, it is spatially partitioned into one or more Prediction Units (PUs), each PU being assigned some prediction information. The Intra or Inter coding mode is assigned on the CU level, see FIG. 2.

The Partitioning of a Coding Unit into Prediction Unit(s) is done according to the partition type, signaled in the bit-stream. For Intra coding unit, only the partition types 2N×2N and N×N, illustrated in FIG. 3, are used. This means only square Prediction Units are used in Intra Coding Units.

On the contrary, Inter Coding Units can use all partition types shown in FIG. 3.

According to the HEVC standard, Coding Units are also divided into so-called transform units, in a recursive way, following a "transform tree". Thus, a transform tree is a quad-tree division of a coding unit, and transform units are the leaf of the transform tree. A transform unit encapsulates the square transform blocks of each picture component corresponding to a considered square spatial area. A transform block is a square block of samples in a single component, where the same transform is applied.

New emerging video compression tools include a Coding Tree Unit representation in the compressed domain is proposed, in order to represent picture data in a more flexible way in the compressed domain. The advantage of this flexible representation of the coding tree is that it provides increased compression efficiency compared to the CU/PU/TU arrangement of the HEVC standard.

The Quad-Tree plus Binary-Tree (QTBT) coding tool provides this increased flexibility. It consists in a coding tree where coding units can be split both in a quad-tree and in a binary-tree fashion. Such coding tree representation of a Coding Tree Unit is illustrated in FIG. 4. The QTBT representation on a block is illustrated in FIG. 15.

The splitting of a coding unit is decided on the encoder side through a rate distortion optimization procedure, which consists in determining the QTBT representation of the CTU with minimal rate distortion cost.

In the QTBT technology, a CU has either square or rectangular shape. The size of coding unit is always a power of 2, and typically goes from 4 to 128.

In additional to this variety of rectangular shapes for a coding unit, this new CTU representation has the following different characteristics compared to HEVC:

The QTBT decomposition of a CTU is made of two stages: first the CTU is split in a quad-tree fashion, then each quad-tree leaf can be further divide in a binary fashion. This is illustrated on the right of FIG. 4 where solid lines represent the quad-tree decomposition phase and dashed lines represent the binary decomposition that is spatially embedded in the quad-tree leaves.

In intra slices, the Luma and Chroma block partitioning structure is separated, and decided independently.

No more CU partitioning into predictions units or transform unit is employed. In other words, each Coding Unit is systematically made of a single prediction unit (previously 2N×2N prediction unit partition type) and single transform unit (no division into a transform tree).

However, further improved compression efficiency is needed compared to QTBT technology. In disclosure, "Asymmetric Coding Units Codec Architecture" (EP-IPA 16306308.4), Coding Units with new rectangular shapes are introduced which result from a new Binary Splitting Mode called asymmetric splitting mode.

SUMMARY OF THE INVENTION

These and other drawbacks and disadvantages of the prior art are addressed by at least one of the described embodiments, which are directed to a method and apparatus for coding or decoding a block of video data. In at least one embodiment, it is proposed to combine a rich set of coding unit splitting modes aimed at providing a flexible rectangular block-based representation of a picture in the compressed domain, while ensuring no redundancy between these splitting modes in terms of spatial topology.

According to at least one general embodiment described herein, there is provided a method for coding a block of video data. The method comprises dividing a block into at least two rectangular sub-blocks with binary or triple splits, and then encoding a sub-block using a transform corresponding to sub-block size.

According to at least one general embodiment described herein, there is provided a method for decoding a block of video data. The method comprises decoding at least one sub-block using an inverse transform corresponding to the sub-block size and then reassembling at least two sub-blocks into a block by inverse splitting operations.

According to another general embodiment described herein, there is provided an apparatus for coding a block of video data. The apparatus comprises a memory, and a processor, configured to divide a block into at least two rectangular sub-blocks with binary or triple splits, and then encode a sub-block using a transform corresponding to sub-block size.

According to another general embodiment described herein, there is provided an apparatus for decoding a block of video data. The apparatus comprises a memory, and a processor, configured to decode at least one sub-block using an inverse transform corresponding to the sub-block size and then reassembling at least two sub-blocks into a block by inverse splitting operations.

According to at least one general embodiment described herein, there is provided any of the above first four embodiments wherein, dividing comprises splitting the block into sub-blocks using asymmetric splitting in a horizontal or vertical direction if the resultant splits do not equal a triple split, and otherwise splitting the block into sub-blocks in a horizontal or vertical direction using triple splitting modes.

According to at least one general embodiment described herein, there is provided any of the above first four embodiments wherein, dividing comprises splitting the block into sub-blocks using asymmetric splitting in any direction if the resultant splits do not equal a triple split, and otherwise splitting the block into sub-blocks in any direction using triple splitting modes.

According to another aspect described herein, there is provided a nontransitory computer readable storage medium containing data content generated according to the method of any one of the aforementioned method embodiments, or by the apparatus of any one of the aforementioned apparatus embodiments for playback using a processor.

According to another aspect described herein, there is provided a signal comprising video data generated according to the method of any one of the aforementioned method embodiments for coding a block of video data, or by the apparatus of any one of the aforementioned apparatus embodiments for coding a block of video data, for playback using a processor.

According to another aspect described herein, there is provided a computer program product comprising instructions which, when the program is executed by a computer, cause the computer to carry out the method of any one of the aforementioned method embodiments.

These and other aspects, features and advantages of the present principles will become apparent from the following detailed description of exemplary embodiments, which is to be read in connection with the accompanying drawings.

BRIEF DESCRIPTION OF THE DRAWINGS

FIG. 4 shows an example quad-tree plus binary-tree coding tree unit representation.

DETAILED DESCRIPTION

An approach is described for improved entropy coding efficiency of transform coefficients in asymmetric coding units, providing good compression and minimal increase in coder design complexity.

For clarity, in this description, "dividing", "segmenting" and "splitting" all mean the same thing, which is the act of performing a straight-line division of a block of pixels. Similarly, "splits", and "divisions" mean the same thing, a grouping of pixels as a result of dividing, splitting or segmenting a block or a sub-block.

In the HEVC video compression standard, a picture is divided into so-called Coding Tree Units (CTU), with typical sizes of 64×64, 128×128, or 256×256 pixels.

Figure 1:
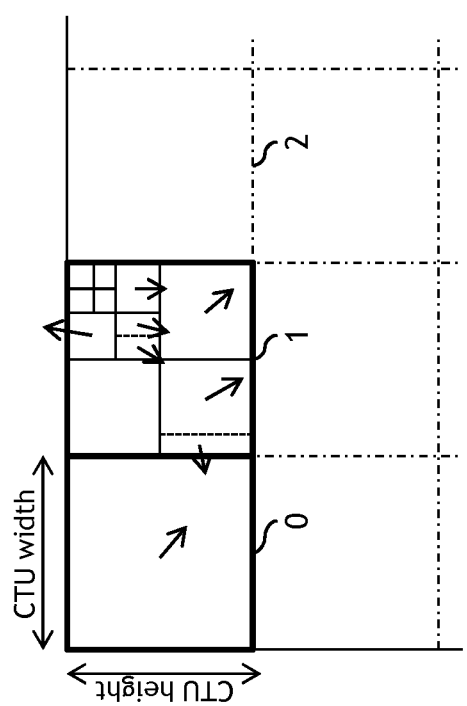
FIG. 1 shows one example of a coding tree unit and coding tree concepts to represent a compressed picture.

Each CTU is represented by a Coding Tree in the compressed domain. This is a quad-tree division of the CTU, where each leaf is called a Coding Unit (CU), see FIG. 1.

Figure 2:
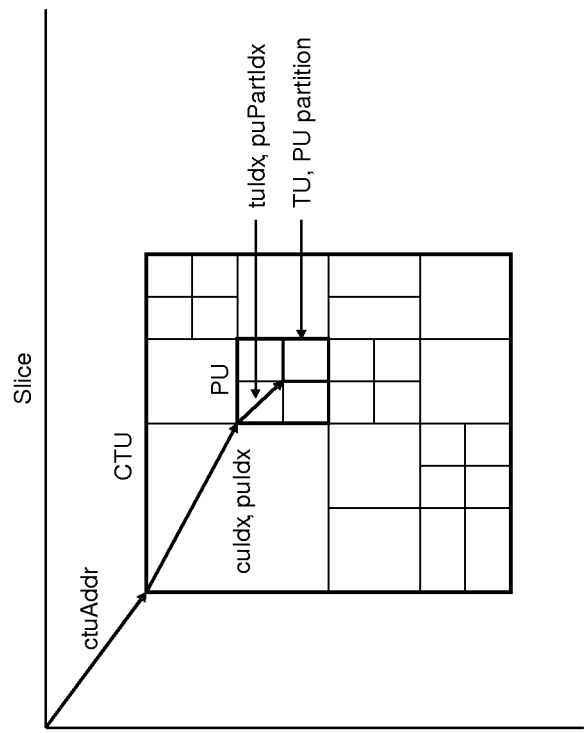
FIG. 2 shows an example of the division of a coding tree unit into coding units, prediction units and transform units.

Each CU is then given some Intra or Inter prediction parameters (Prediction Info). To do so, it is spatially partitioned into one or more Prediction Units (PUs), each PU being assigned some prediction information. The Intra or Inter coding mode is assigned on the CU level, see FIG. 2.

Figure 3:
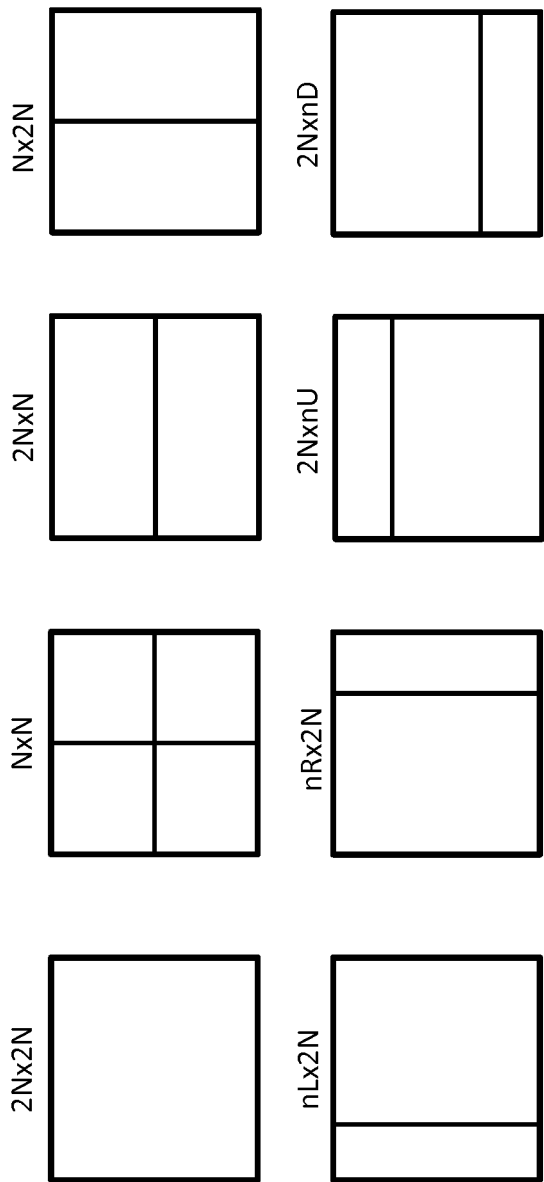
FIG. 3 shows an example of partitioning of coding units.

The Partitioning of a Coding Unit into Prediction Unit(s) is done according to the partition type, signaled in the bit-stream. For Intra coding unit, only the partition types 2N×2N and N×N, illustrated in FIG. 3 are used. This means only square Prediction Units are used in Intra Coding Units.

On the contrary, Inter Coding Units can use all partition types shown in FIG. 3.

According to the HEVC standard, Coding Units are also divided into so-called transform units, in a recursive way, following a "transform tree". Thus, a transform tree is a quad-tree division of a coding unit, and transform units are the leaf of the transform tree. A transform unit encapsulates the square transform blocks of each picture component corresponding to a considered square spatial area. A transform block is a square block of samples in a single component, where the same transform is applied.

New emerging video compression tools include a Coding Tree Unit representation in the compressed domain in order to represent picture data in a more flexible way in the compressed domain. The advantage of this flexible representation of the coding tree is that it provides increased compression efficiency compared to the CU/PU/TU arrangement of the HEVC standard.

The Quad-Tree plus Binary-Tree (QTBT) coding tool provides this increased flexibility. It consists in a coding tree where coding units can be split both in a quad-tree (4 sub-units) and in a binary-tree (2 sub-units) fashion. Such coding tree representation of a Coding Tree Unit is illustrated in FIG. 4.

The splitting of a coding unit is decided on the encoder side through a rate distortion optimization procedure, which consists in determining the QTBT representation of the CTU with minimal rate distortion cost.

In the QTBT technology, a CU has either square or rectangular shape. The size of coding unit is always a power of 2, and typically goes from 4 to 128.

In additional to this variety of rectangular shapes for a coding unit, this new CTU representation has the following different characteristics compared to HEVC:

- The QTBT decomposition of a CTU is made of two stages: first the CTU is split in a quad-tree fashion, then each quad-tree leaf can be further divided in a binary fashion. This is illustrated on the right of FIG. 4 where solid lines represent the quad-tree decomposition phase and dashed lines represent the binary decomposition that is spatially embedded in the quad-tree leaves.
- In intra slices, the Luma and Chroma block partitioning structure is separated, and decided independently.
- No more CU partitioning into predictions units or transform unit is employed. In other words, each Coding Unit is systematically made of a single prediction unit (previously 2N×2N prediction unit partition type) and single transform unit (no division into a transform tree).

The described embodiments concern the domain of picture coding unit representation in compression and aims at further improved compression efficiency compared to QTBT technology.

In another application, (Asymmetric Coding Units Codec Architecture, EP-EPA 16306308.4), it is proposed to introduce new asymmetric partitions in QTBT. These new shapes consist in sizes equal to $3 \cdot 2^n$ in width and/or height. Furthermore, a CU with a size multiple of 3 in width or height can be further split in a binary fashion, horizontally or vertically. We call this type of split, a one quarter split.

These embodiments support the coding/decoding with current one quarter split, when one of the sub-blocks has a size $3 \cdot 2^n$ in one direction. If we split this sub-block again with a one quarter split in the same direction, we will obtain 2 blocks of size $3 \cdot 2^{n-2}$ and $3^2 \cdot 2^{n-2}$ in the same direction. For example, two successive asymmetric horizontal top split: a block 32×32 is first divided into 32×8 and 32×24, the second sub-block is then divided further in 32×6 and 32×18.

A drawback is that blocks of size 18 cannot be divided by 4, so it can't be further split. Successive asymmetric splits will lead to many different block sizes. Many different block sizes will require many new transform sizes associated with each block size. These transforms require a lot of memory for a fast and efficient implementation.

Figure 7:
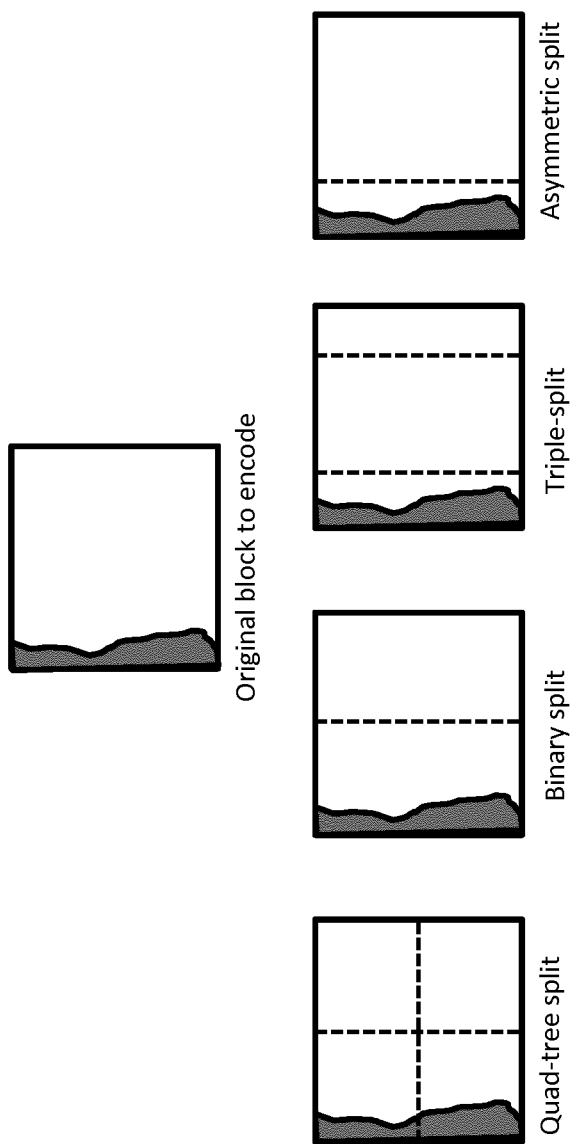
FIG. 7 shows different splits of a block to handle a block non-uniformity.

In a first prior approach, triple-trees are introduced. Triple trees, or triple splits, are splitting of a coding unit or sub-unit into three portions. One of the advantage is that all sub-blocks are a power of 2. The main drawback is that it does not offer as much flexibility to optimally choose the partitioning of the block as it forces three sub-blocks, even if only two are necessary, for example, when the boundary of an object is passing close to the border (see FIG. 7, triple-split vs asymmetric split).

The basic idea of a second prior approach (EP-EPA 16306308.4) is to have an asymmetric split ratio dependent on the block size. For a coding unit with size (w, h) (width and height) with height 2n, asymmetric split type HOR_UP (horizontal-up) leads to 2 sub-coding units with respective rectangular sizes $$\left(w, \frac{h}{4}\right) \text{ and } \left(w, \frac{3h}{4}\right).$$

But tor a coding unit with size (w, h) with height $3 \cdot 2^n$, asymmetric split type HOR_DOWN (horizontal-down), will lead to 2 sub-coding units with respective rectangular sizes $$\left(w, \frac{2h}{3}\right) \text{ and } \left(w, \frac{h}{3}\right).$$

We call this type of split, a one third split.

Figure 9:
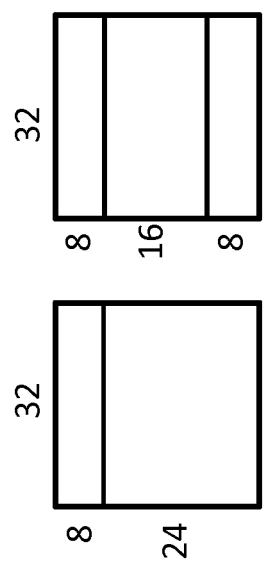
FIG. 9 shows a first asymmetric split (HOR_UP ¼) followed by a second asymmetric split (HOR_DOWN ⅓) of a block.

For example, for a block 32×32, a first asymmetric split (a one quarter split) leads to 32×8 and 32×24 blocks, a second asymmetric split (a one third split) for the second sub-block leads to 32×16 and 32×8 sub-blocks, as shown in FIG. 9. So, the splitting size (one-quarter/one-third split) depends on the current size of the block.

Therefore, a CU with width or height equal to $3 \cdot 2^n$ may be selected by the encoder. In such case, an Intra prediction and Inter process of some rectangular blocks with size multiple of 3 are performed. Additionally, a 2D transform with size $3 \cdot 2^n$ in width or height, and the subsequent transform coefficient entropy coding process are performed. These technical aspects did not exist in HEVC or in QTBT.

A last coding unit splitting mode, called the horizontal or vertical triple tree splitting mode, consists in dividing a coding unit (CU) into 3 sub-coding-units (sub-CUs), with respective sizes equal ¼, ½ and ¼ of the parent CU size in the direction of the considered spatial division. This is illustrated in FIG. 6.

Figure 5:
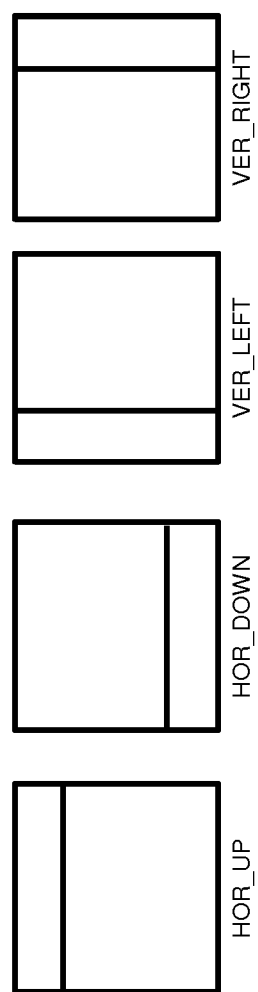
FIG. 5 shows examples of additional coding unit binary asymmetric splitting modes in QTBT.
Figure 6:
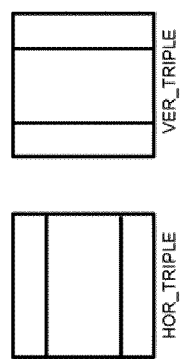
FIG. 6 shows triple mode splitting of a block.

One context of the described embodiments is a video coding/decoding scheme where all the CU splitting modes from FIG. 4, FIG. 5 and FIG. 6 are activated in the video coding, which means the encoder can choose any of these splitting modes and signal them to the decoder.

Figure 8:
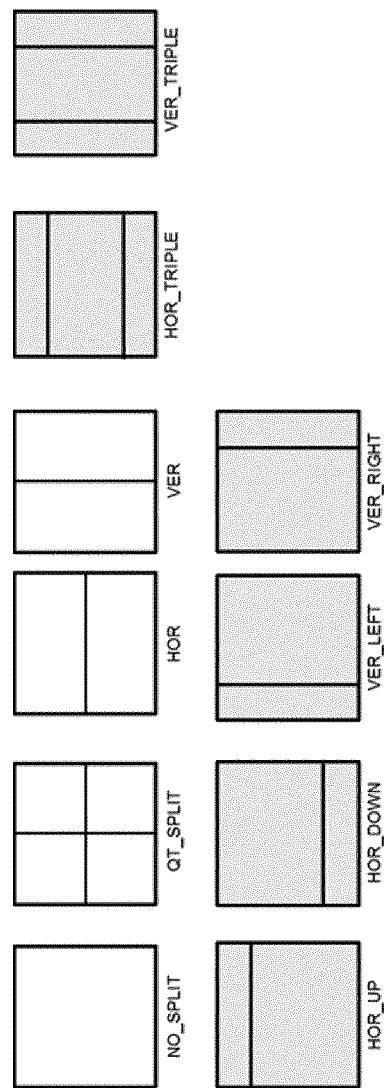
FIG. 8 shows the set of all Coding Unit spitting modes supported in the video coding scheme herein described.

The whole set of CU splitting modes present in such codec are shown in FIG. 8.

FIG. 8 illustrates the set of all Coding Unit splitting modes supported in the video coding scheme considered herein. In actual video images, this rich set of coding unit topologies help in having coding structures that spatially match the structures and discontinuities contained in an original signal.

Figure 11:
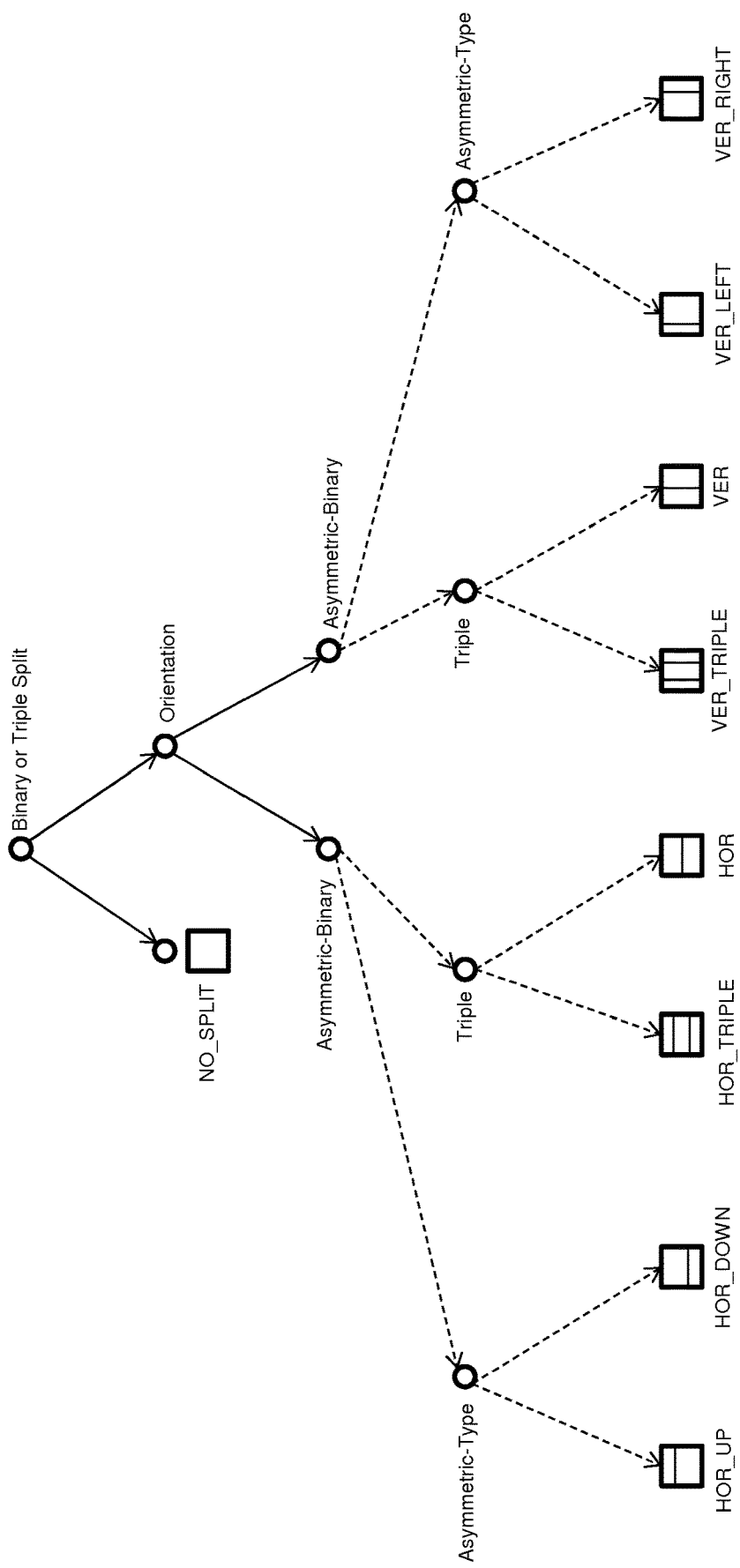
FIG. 11 shows a syntax arrangement for binary and triple tree splitting.

FIG. 11 shows a syntax arrangement for binary and triple tree splitting.

The aforementioned prior approach provides an asymmetric splitting process where the size ratio between the sub-CU and the parent-CU depends on the size of the parent CU. This allows cascading several asymmetric splitting operations of a given CU, potentially leading to the configuration of FIG. 9.

However, this approach leads to a coding process where several different successions of splitting operations may lead to a same spatial division of a given coding unit. In FIG. 9, one sees the obtained topology is identical to the topology that would be obtained with the HOR_TRIPLE splitting mode. Thus, some redundancy between several coding tree representations exists in such situation. This redundancy leads to sub-optimal coding efficiency, since a given splitting syntax specification supports several ways to perform the same spatial divisions. In addition, this redundancy also leads to high complexity on the encoder side, because the rate distortion optimization process evaluates several coding tree representations that are identical from topology viewpoint.

The problem addressed by at least one of the described embodiments is how to ensure there is no redundancy between different successions of CU splitting operations, when the triple tree mode and the asymmetric binary tree modes are used in the same video compression design.

Figure 16:
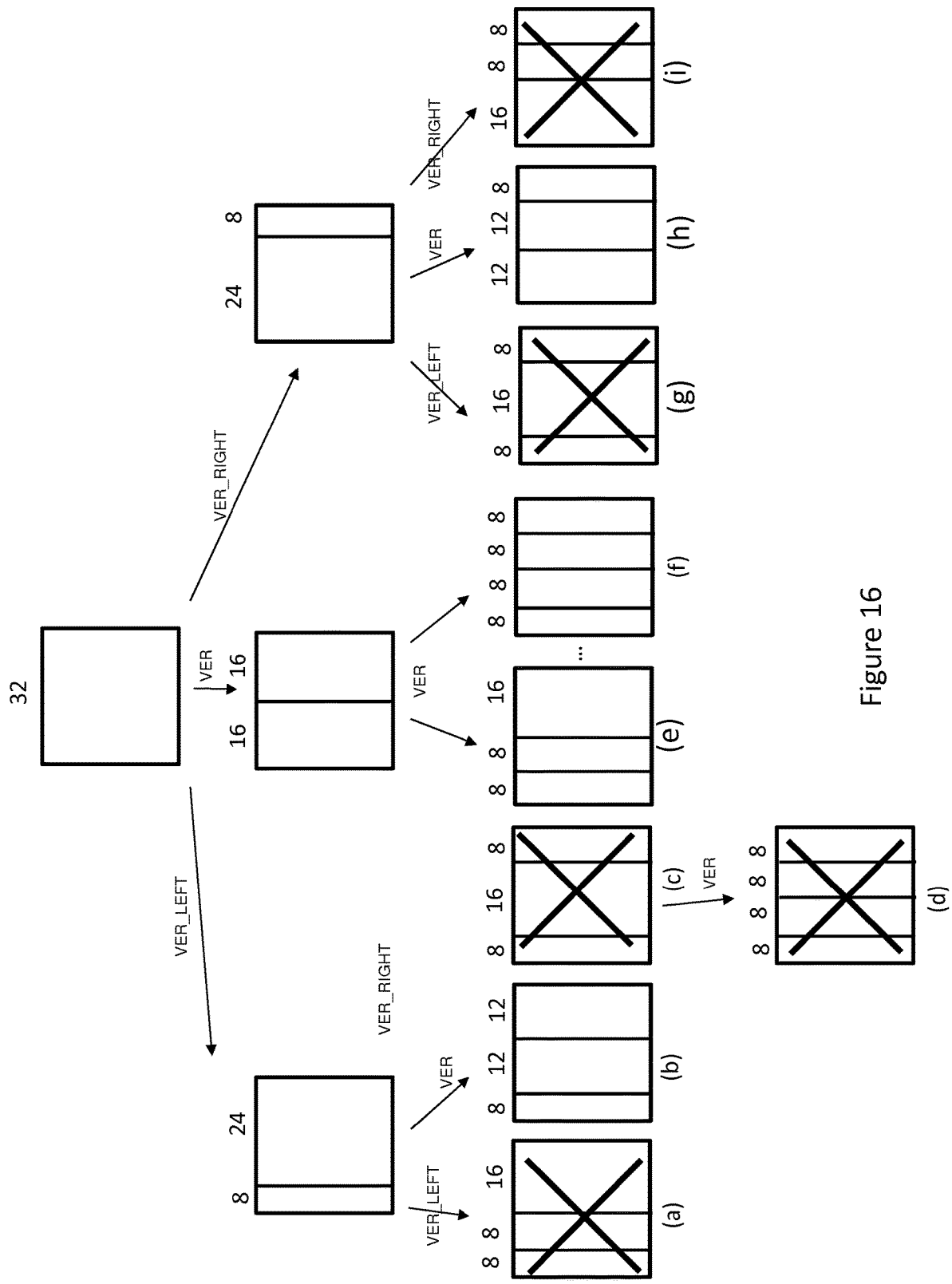
FIG. 16 shows an example of restriction in a prior approach.

A first way to solve the problem is to forbid the use of binary asymmetric splitting with block size ratio (1/3, 2/3) as disclosed in the aforementioned prior approach. An example of various allowed and forbidden splits in this prior approach is illustrated in FIG. 16. The advantage of the approach described herein is to ensure that the splitting configuration as on the right side of FIG. 9 cannot be reached through successive asymmetric binary splits, and can only be reached through the HOR_TRIPLE splitting mode, such as the one shown in FIG. 6.

The drawback is that some topologies cannot be reached with the triple tree and the asymmetric binary tree in such a mutually exclusive way.

The basic idea of the embodiments described herein is to allow the use of the asymmetric splitting mode with ratio (1/3, 2/3) of the prior approach, while preventing the codec from emulating the triple tree splitting through successive asymmetric binary splits with adaptive block size ratios. Typical examples of allowed and disallowed splitting configurations according to the proposed method are shown in FIG. 10.

Figure 10:
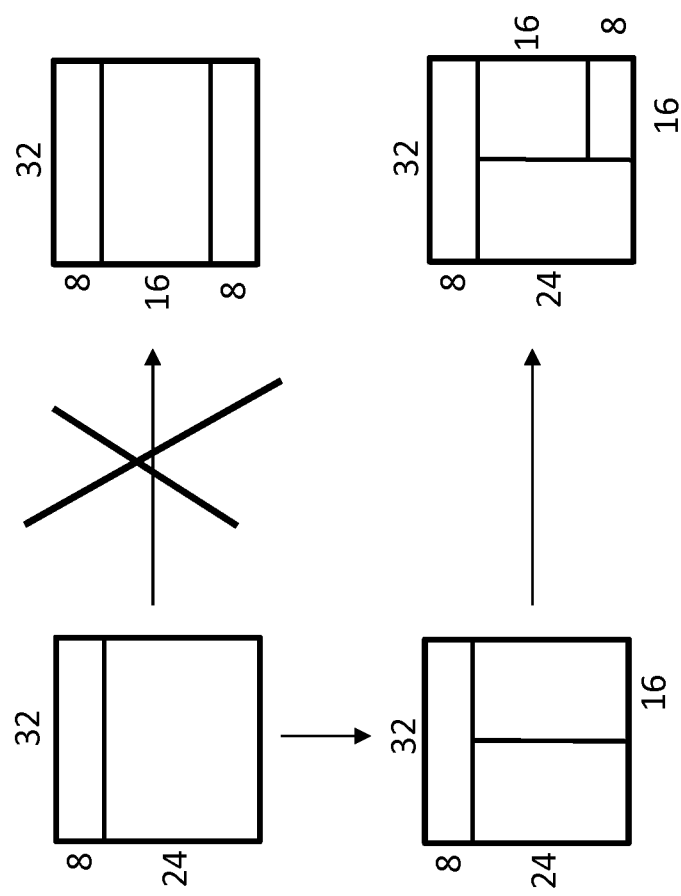
FIG. 10 shows a Coding Unit splitting configuration (bottom right) that can be achieved with the coding scheme herein described.

The advantage of this method is that is allows reaching topologies such as those illustrated on the bottom-right part of FIG. 10. Indeed, if the splitting ratio (1/3, 2/3) was disabled, then 24×16 exemplary CU issued from the asymmetric then symmetric binary splitting could not be further divided into a 16×16 and a 16×8 sub-CUs.

The proposed method comprises two characteristics as follows:
  The (1/3, 2/3) asymmetric splitting ratio can let the codec use the embedding of an asymmetric splitting with an already existing CU whose size results from, among others, an asymmetric split that has already been performed at a higher hierarchy level in the considered coding tree.
  A restriction is put on the usage of the Asymmetric Binary Tree splitting mode, to prevent a succession of asymmetric splitting operations to simulate any Triple Tree mode (HOR_TRIPLE of VER_TRIPLE). Simulating means producing the same, or equivalent, spatial division into coding units as another different series of splitting operations.

One advantage of the proposed method is that it enables splitting configurations similar to that on the bottom of FIG. 10. But the proposed method eliminates the need to reach splitting configurations similar to that on the top of FIG. 10 through two successive binary asymmetric splits because it can be reached through a single triple split.

Figure 12:
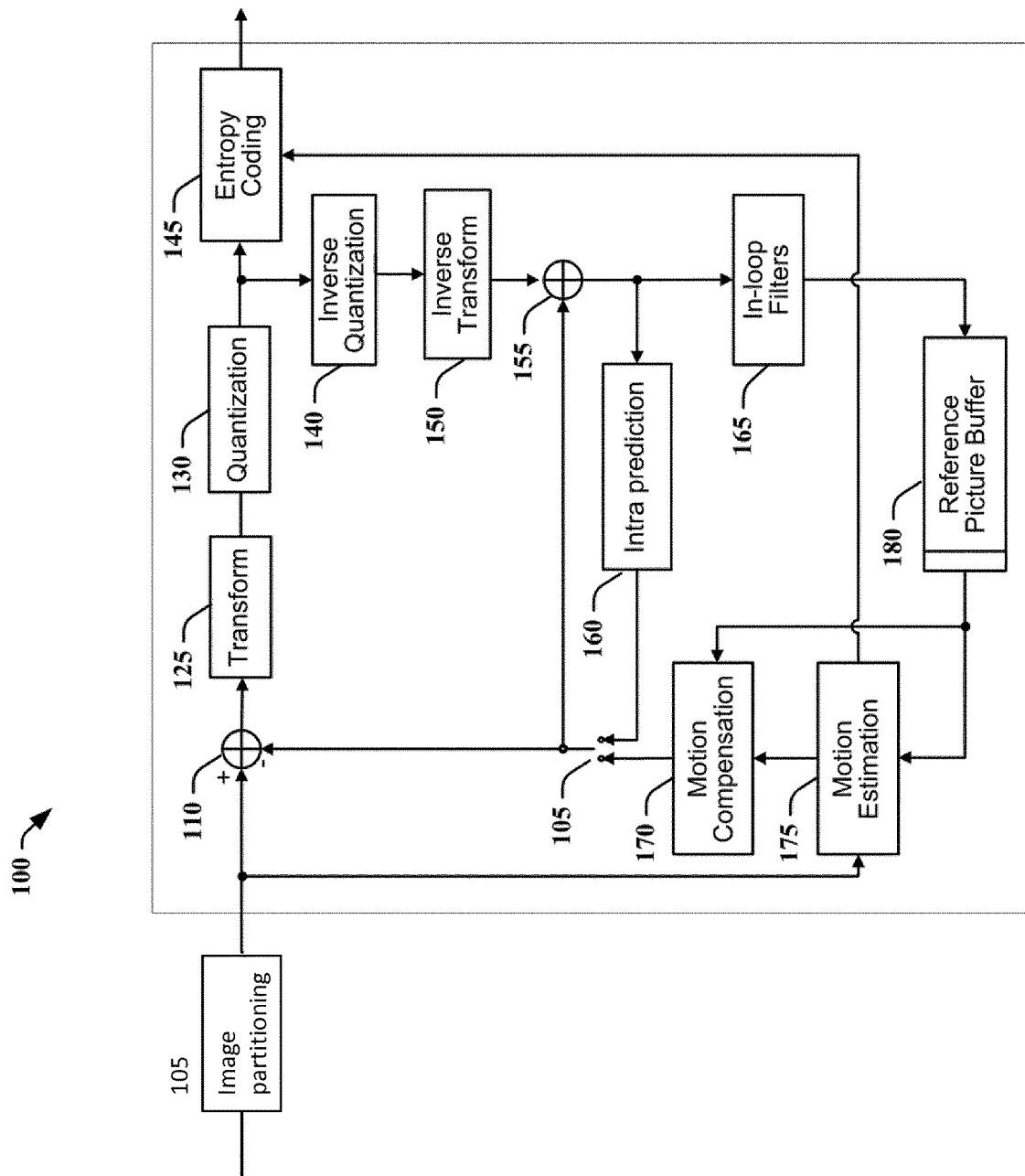
FIG. 12 shows an example of the proposed function block interfacing with a generic video compression scheme.

FIG. 12 shows one example of where the image partitioning block can be located relative to a typical encoder. The codec module that is impacted concerns the division of the picture to code/decode in blocks (see 105 in FIG. 10) with various square and rectangular sizes.

Figure 13:
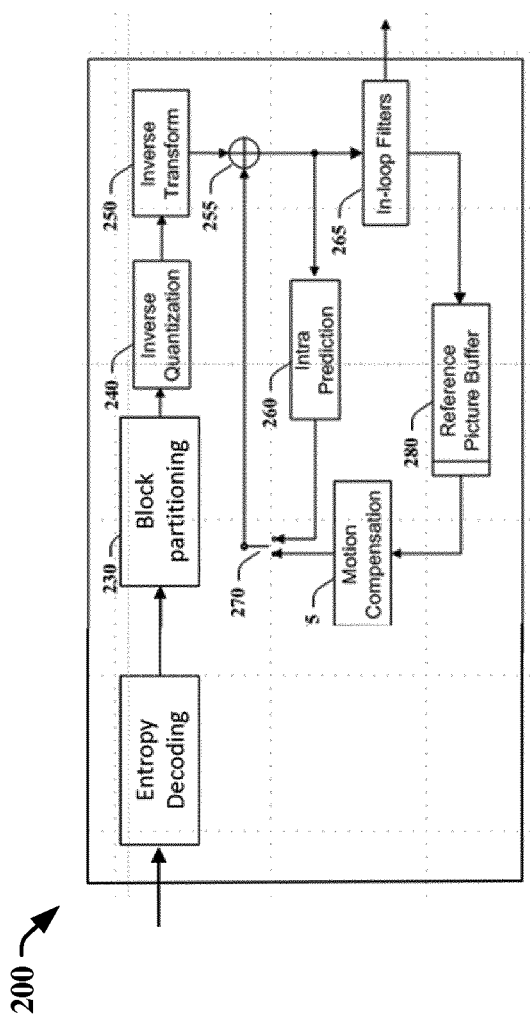
FIG. 13 shows a generic video decoding scheme.

FIG. 13 shows a typical decoder in which the inverse process would take place.

Figure 14:
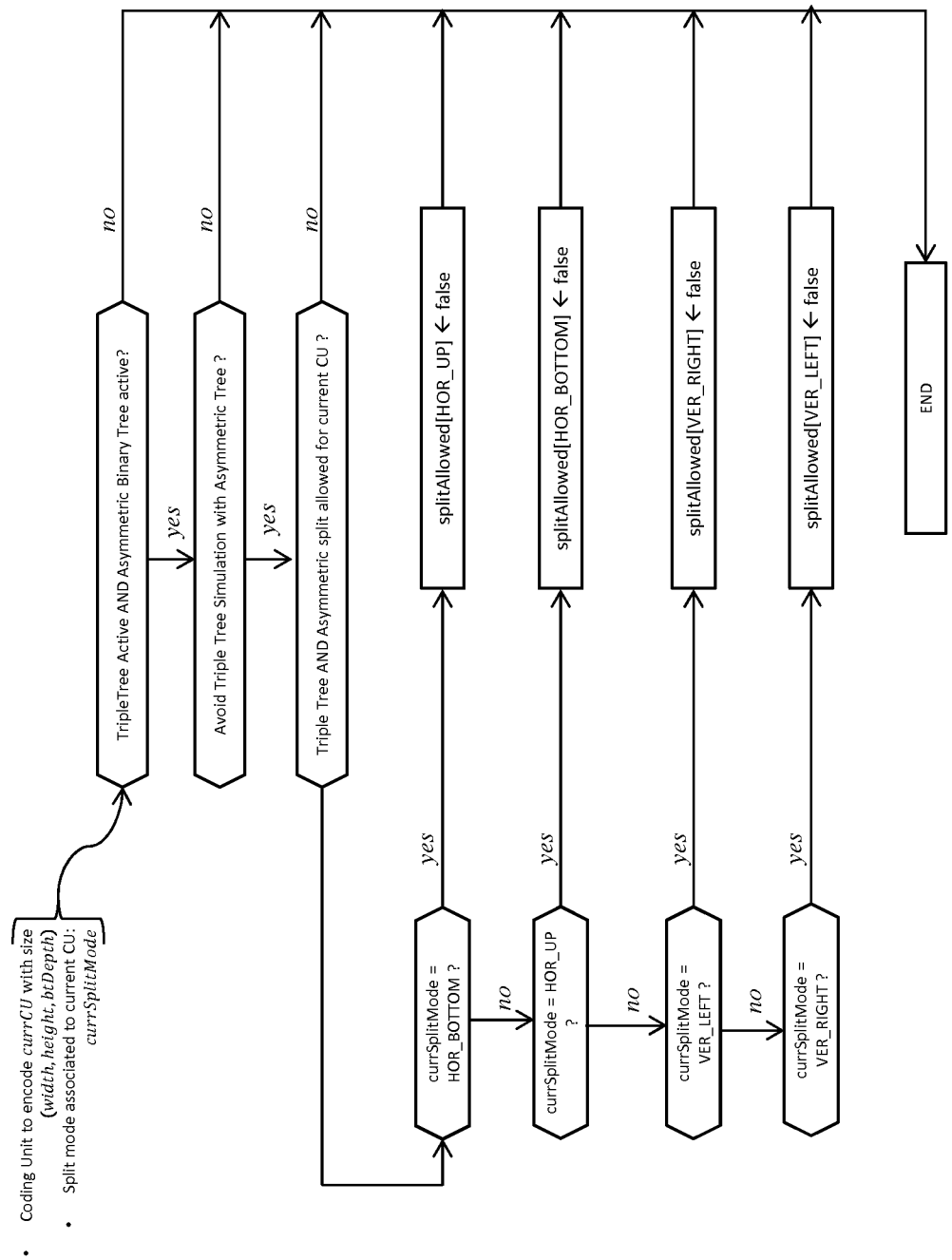
FIG. 14 shows an example of a restriction on the use of asymmetric binary trees to prevent the replication of a triple tree operation.
Figure 15:
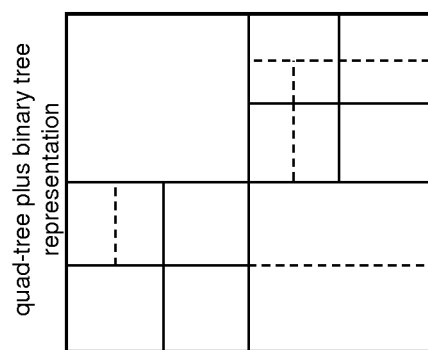
FIG. 15 shows one embodiment of a the Quad Tree plus Binary Tree representation on a coding block.

FIG. 14 shows one embodiment of a method to perform the restriction process corresponding to the second characteristic of the proposed method.

The method comprises the following:

The inputs to the method are the following:
  The current CU to encode currCU with size width, height, and current binary/triple tree depth value noted btDepth
  The splitting mode associated with current CU, noted currSplitMode The first step of the process comprises checking if both the triple and asymmetric binary trees are allowed in the current codec configuration. If not, the process is finished since no simulation of the triple split mode by asymmetric splits can happen.

In a next step, a check is performed to determine whether the restriction on asymmetric splitting to avoid simulating triple tree is active in current codec configuration. If not, the process is over.

The next step checks whether both binary asymmetric and triple splitting modes are allowed for a current Coding Unit. Basically, this comprises checking the following:
  The depth level associated with a current CU is lower than the maximum depth level allowed for the current CU. This maximum depth level is chosen as an encoder configuration parameter and is coded into the bitstream, for example in the Sequence Parameter Set (SPS) or the Picture Parameter Set (PPS) or a slice header.
  The sub-CU size induced by splitting a current CU through triple or asymmetric splitting modes is supported by the coding/decoding system. Particularly, this implies that the concerned transform sizes in luma and chroma component are supported.

If asymmetric or triple splitting mode is not allowed for a current CU, then the process is over.

Otherwise, the following takes place:

For each of the four existing binary asymmetric split modes, the method tests if the current CU's splitting mode currSplitMode is equal to the considered binary asymmetric mode.

If so, the opposite asymmetric split mode is disallowed. Opposite means the binary asymmetric mode with same orientation but different type. (ex: the opposite of HOR_UP is HOR_DOWN)

Once the test has been performed for each of the 4 asymmetric split modes, then the process is over.

This section depicts the modifications brought to the normative CU splitting mode signaling.

Table 1 shows the specification of the signaling of the splitting mode without the method proposed here.

TABLE 1 bt split mode syntax according used for coding CUs, according to the initial asymmetric CU tool

| | Descriptor |
|---|---|
| Bt_split_mode(x0,y0,width,height,cqtDepth){ | |
|   if(btSplitAllowed(x0,y0,width,height){ | |
|     btSplitFlag | ae (v) |
|     if(horizontalSplitAllowed && horizontalSplitAllowed){ | |
|       btSplitOrientation | ae (v) |

TABLE 1-continued bt split mode syntax according used for coding CUs,
according to the initial asymmetric CU tool

| | Descriptor |
|---|---|
| if(btSplitOrientation==HOR && horizontal_asymmetric_allowed){ | |
|     horAsymmetricSplitFlag | ae (v) |
|     if(horAsymmetricSplitFlag==true){ | |
|       horizontal_asymmetric_type | ae (v) |
|     } | |
|     if(horAsymmetricSplitFlag==false && horizintal_triple_allowed){ | |
|       horizontal_triple_flag | ae (v) |
|     } | |
| } | |
| if(btSplitOrientation==VER && vertical_asymmetric_allowed){ | |
|     verAsymmetricSplitFlag | ae (v) |
|     if(verAsymmetricSplitFlag==true){ | |
|       vertical_asymmetric_type | ae (v) |
|     } | |
|     if(verAsymmetricSplitFlag==false && vertical_triple_allowed){ | |
|       vertical_triple_flag | ae (v) |
|     } | |
|   } | |
|  } | |
| } | |

Table 2 shows the specification of the signaling of the splitting mode with the method proposed here.

As can be seen, the normative modification due to proposed method lies in the conditions marked in italic in the table. Indeed, variables_horizontal_asymmetric_allowed and horizontal_asymmetric_allowed computed as a function of flags splitAllowed[HOR_UP], splitAllowed[HOR_BOTTOM], splitAllowed[VER_LEFT], splitAllowed[VER_RIGHT], which depend on the process of FIG. 14.

horizontal_asymmetric_allowed=(splitAllowed[HOR_UP]||splitAllowed[HOR_BOTTOM]);
vertical_asymmetric_allowed=(splitAllowed[VER_LEFT]||splitAllowed[VER_RIGHT]);

Moreover, the existence of the flags horizontal_asymmetric_type and vertical_asymmetric_type also depends on the flags splitAllowed[HOR_UP], splitAllowed[HOR_BOTTOM], splitAllowed[VER_LEFT], splitAllowed[VER_RIGHT], which depend on the process of FIG. 14.

In a first alternate embodiment, the proposed restriction on the use of Asymmetric Binary Tree splitting to prevent a simulation of Triple Tree splitting is performed both by the encoder and the decoder in a synchronous way, to jointly limit the combination of the rate distortion search for best splitting modes by an encoder, while improving the coding efficiency for the encoder, bit-stream, and decoder.

In a second alternate embodiment, the proposed restriction on the use of Asymmetric Binary Tree splitting to prevent a simulation of Triple Tree splitting is performed only on the encoder side, to speed-up the rate distortion search for best splitting modes, with very limited loss in terms of coding efficiency.

The aforementioned embodiments have been described with respect to an encoder or encoding operation. However, the corresponding inverse operations are applicable to a decoder or decoding operation. For example, a decoding operation can perform decoding of at least one sub-block of a plurality of sub-blocks that comprise the block, using processing such that a transform that corresponds to each sub-block size is used, and reassembling the plurality of sub-blocks into the block, wherein reassembling comprises an inverse operation of dividing the block. The reassembling operation is substantially the inverse of the encoding dividing operations.

TABLE 2 bt split mode syntax according used for coding
CUs, according to method proposed here

| | Descriptor |
|---|---|
| Bt_split_mode(x0,y0,width,height,cqtDepth){ | |
|   if(btSplitAllowed(x0,y0,width,height){ | |
|     btSplitFlag | ae (v) |
|     if(horizontalSplitAllowed && horizontalSplitAllowed){ | |
|       btSplitOrientation | ae (v) |
|       if(btSplitOrientation==HOR && *horizontal_asymmetric_allowed*){ | |
|         horAsymmetricSplitFlag | ae (v) |
|         if(horAsymmetricSplitFlag==true & & *splitAllowed[HOR_UP]* && *splitAllowed[HOR_DOWN]*){ | |
|           horizontal_asymmetric_type | ae (v) |
|         } | |
|         if(horAsymmetricSplitFlag==false && | |

TABLE 2-continued bt split mode syntax according used for coding
CUs, according to method proposed here

```
                                                                    Descriptor horizontal_triple_allowed){
                       horizontal_triple_flag                       ae (v)
                   }
               }
           if(btSplitOrientation==VER &&
           vertical_asymmetric_allowed){
                   verAsymmetricSplitFlag                            ae (v)
                   if(verAsymmetricSplitFlag==true & &
splitAllowed[VER_LEFT] && splitAllowed[VER_RIGHT]){
                       vertical_asymmetric_type                      ae (v)
                   }
                   if(verAsymmetricSplitFlag==false &&
vertical_triple_allowed){
                       vertical_triple_flag                          ae (v)
                   }
               }
           }
       }
```

Figure 17:
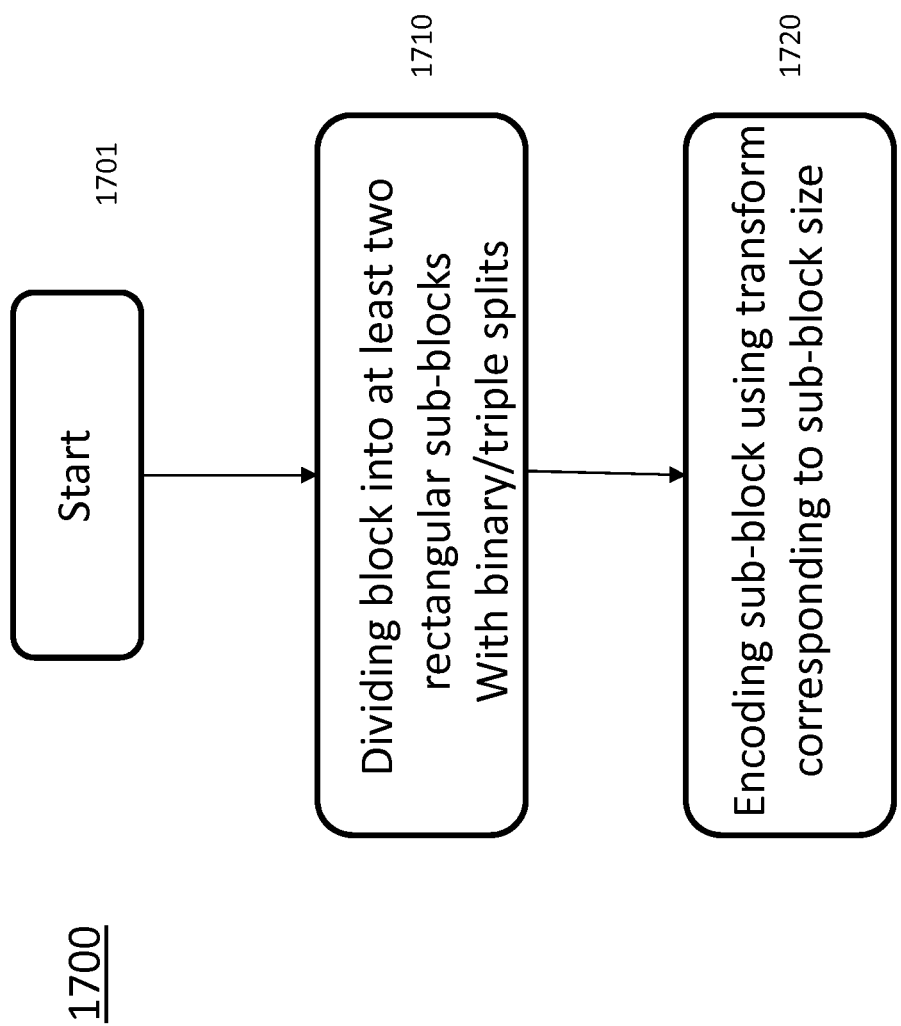
FIG. 17 shows one embodiment of a method for encoding a video block using one general aspect described herein.

FIG. 17 shows one embodiment of a method 1700 for coding a block of video data. The method commences at Start block 1701 and proceeds to block 1710 for dividing the block into at least two rectangular sub-blocks with binary and/or triple splits. Control proceeds from block 1710 to block 1720 for encoding each sub-block using processing such that a transform that corresponds to each sub-block size is used.

Figure 18:
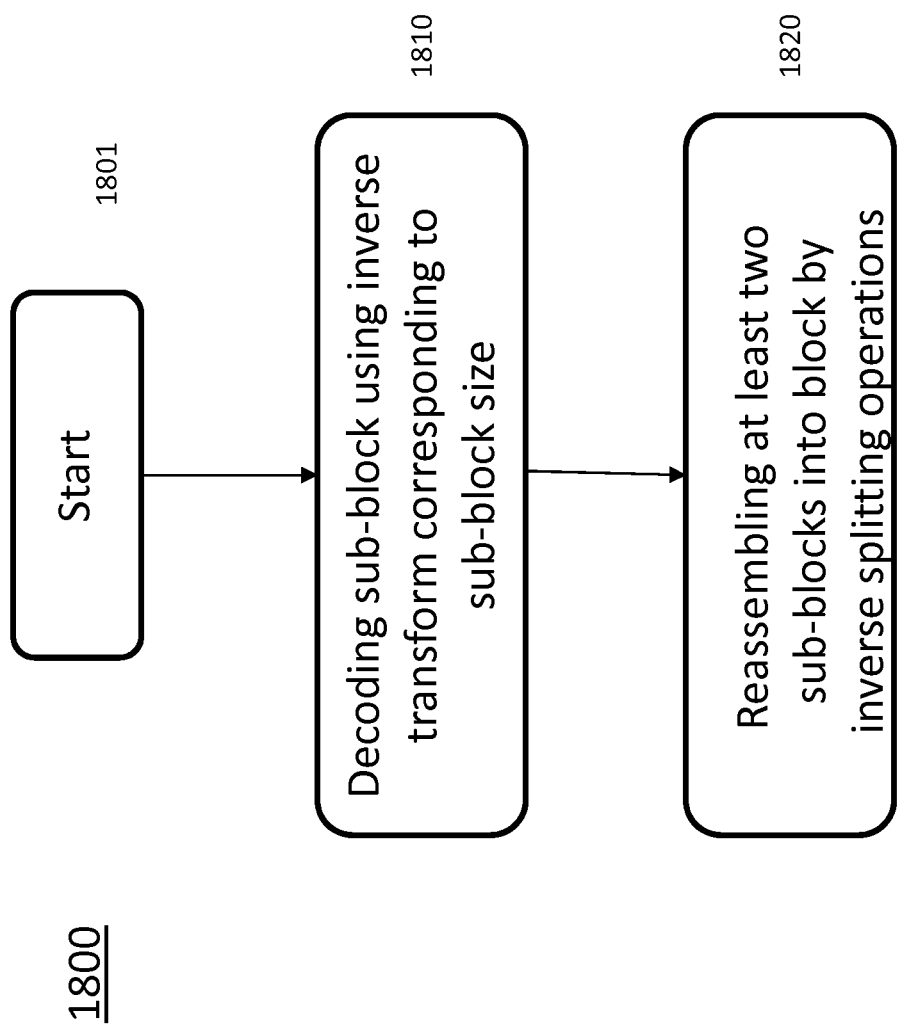
FIG. 18 shows another embodiment of a method for decoding a video block using one general aspect described herein.

FIG. 18 shows one embodiment of a method 1800 for decoding a block of video data. The method commences at Start block 1801 and proceeds to block 1810 for decoding at least one sub-block of a plurality of sub-blocks that comprise the block using processing such that a transform that corresponds to each sub-block size is used. Control then proceeds from block 1810 to block 1820 for reassembling the plurality of sub-blocks into the block, wherein reassembling comprises an inverse operation of dividing, or splitting, the block.

Figure 19:
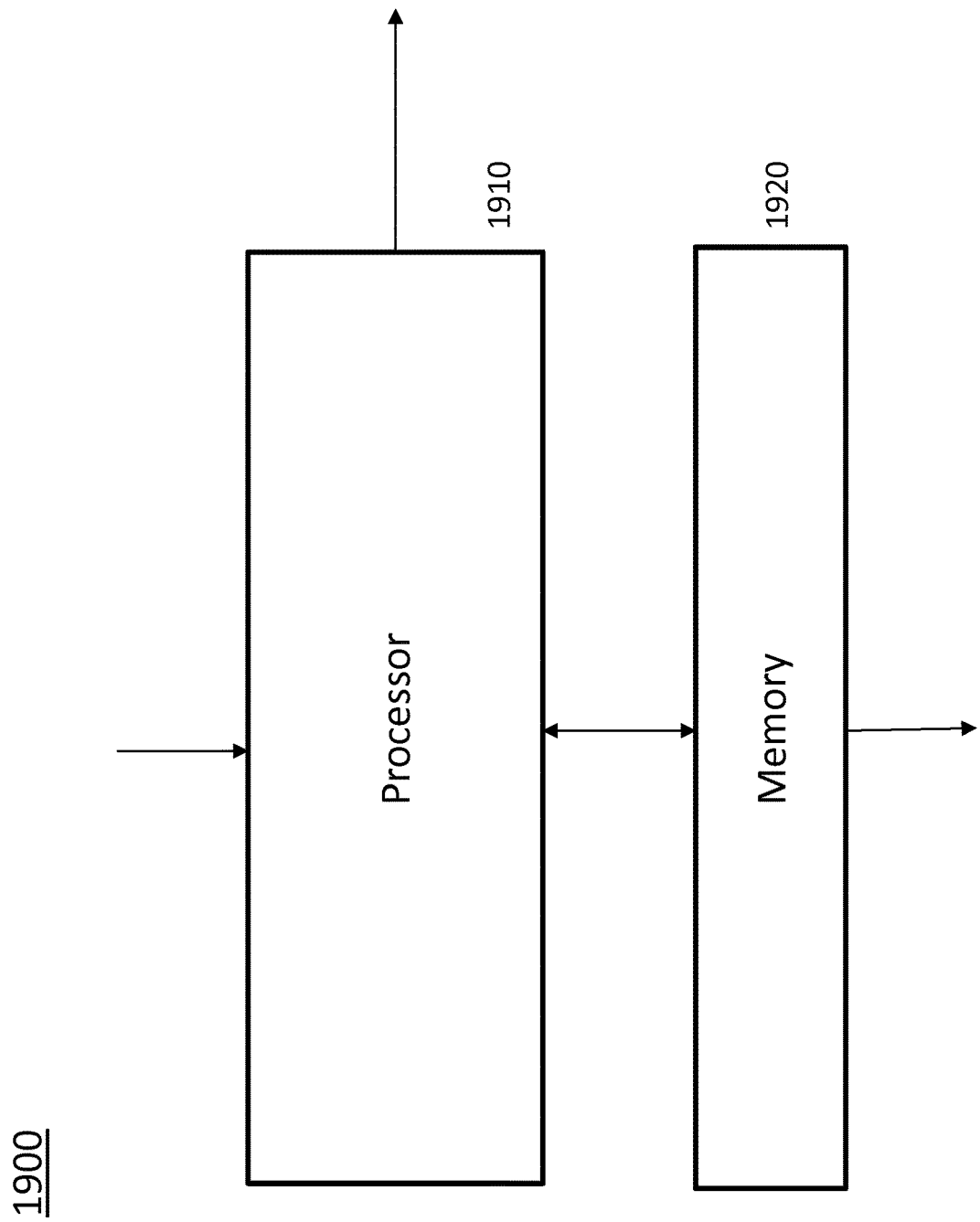
FIG. 19 shows one embodiment of an apparatus for encoding or decoding a block of video data using at least one general aspect described herein.

FIG. 19 shows one embodiment of an apparatus 1900 for coding or decoding a block of video data. The apparatus comprises Processor 1910 which has input and output ports and is in signal connectivity with Memory 1920, also having input and output ports. The apparatus can execute any of the aforementioned method embodiments, or variations.

Figure 20:
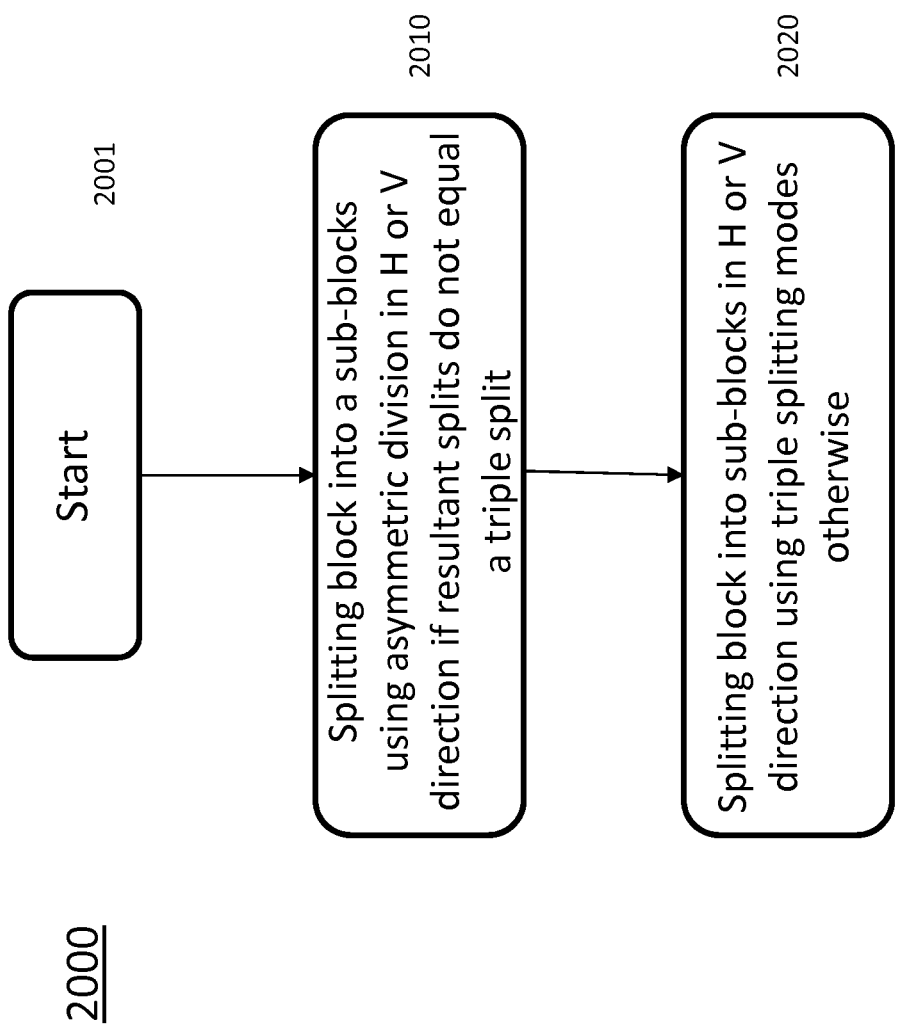
FIG. 20 shows another embodiment of a method for dividing a block of video data using at least one general aspect described herein.

FIG. 20 shows another embodiment of a method 2000 to implement the dividing of the aforementioned method or apparatus embodiments. The method commences at Start block 2001 and proceeds to block 2010 for splitting a block into sub-blocks using asymmetric division in a horizontal or vertical direction if the resultant splits do not equal a triple split. Otherwise, control proceeds from block 2010 to block 2020 for splitting the block into multiple sub-blocks in a horizontal or vertical direction if the resultant split of block 2010 does produce equivalent results as a triple split.

Figure 21:
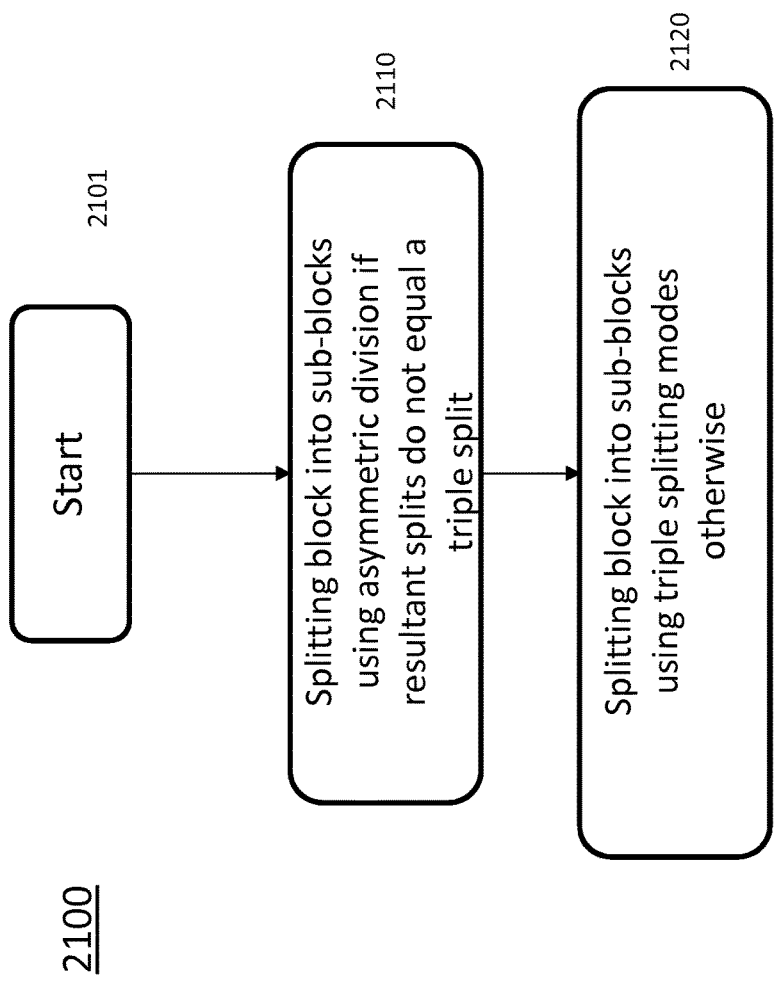
FIG. 21 shows another embodiment of a method for dividing a block of video data using at least one general aspect described herein.

FIG. 21 shows another embodiment of a method 2100 to implement the dividing of the aforementioned method or apparatus embodiments. The method commences at Start block 2101 and proceeds to block 2110 for splitting the block into multiple sub-blocks using asymmetric division if the resultant splits do not equal a triple split. Otherwise, control proceeds from block 2110 to block 2120 for splitting the block into multiple sub-blocks if the resultant split of block 2110 does produce equivalent results as a triple split.

The functions of the various elements shown in the figures can be provided using dedicated hardware as well as hardware capable of executing software in association with appropriate software. When provided by a processor, the functions can be provided by a single dedicated processor, by a single shared processor, or by a plurality of individual processors, some of which can be shared. Moreover, explicit use of the term "processor" or "controller" should not be construed to refer exclusively to hardware capable of executing software, and can implicitly include, without limitation, digital signal processor ("DSP") hardware, read-only memory ("ROM") for storing software, random access memory ("RAM"), and non-volatile storage.

Other hardware, conventional and/or custom, can also be included. Similarly, any switches shown in the figures are conceptual only. Their function can be carried out through the operation of program logic, through dedicated logic, through the interaction of program control and dedicated logic, or even manually, the particular technique being selectable by the implementer as more specifically understood from the context.

The present description illustrates the present ideas. It will thus be appreciated that those skilled in the art will be able to devise various arrangements that, although not explicitly described or shown herein, embody the present ideas and are included within its spirit and scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which can be substantially represented in computer readable media and so executed by a computer or processor, whether or not such computer or processor is explicitly shown.

In the claims herein, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

The invention claimed is:

1. A method for coding a block of video data, comprising:
   dividing said block into at least two rectangular sub-blocks by using binary or triple splits such that successive binary splits are not used if the successive binary splits result in an equivalent triple split, and
   encoding each sub-block using processing such that a transform that corresponds to each sub-block size is used,
   wherein said dividing comprises:
      splitting said block into at least two rectangular sub-blocks using horizontal or vertical divisions, when successive divisions using asymmetric splitting do not result in an equivalent split attained using a triple splitting mode, and wherein splitting comprises binary symmetric splits, one-fourth and three-fourths splits, one-third and two-third splits, and triple splits, wherein any of the splits can be in a horizontal or vertical direction, and
      splitting said block into at least two rectangular sub-blocks using a triple splitting mode instead of said asymmetric splitting, when said successive asymmetric divisions using asymmetric splitting do result in an equivalent split attained using a triple splitting mode.

2. A method for decoding a block of video data, comprising:
   decoding at least one sub-block of a plurality of sub-blocks that comprise said block, using processing such that an inverse transform that corresponds to each sub-block size is used, and
   reassembling the plurality of sub-blocks into said block, wherein reassembling comprises an inverse operation of dividing the block by using binary or triple splits such that successive binary splits are not used if the successive binary splits result in an equivalent triple split,
   wherein said dividing comprises:
      splitting said block into at least two rectangular sub-blocks using horizontal or vertical divisions, when successive divisions using asymmetric splitting do not result in an equivalent split attained using a triple splitting mode, and wherein splitting comprises binary symmetric splits, one-fourth and three-fourths splits, one-third and two-third splits, and triple splits, wherein any of the splits can be in a horizontal or vertical direction, and
      splitting said block into at least two rectangular sub-blocks using a triple splitting mode instead of said asymmetric splitting, when said successive asymmetric divisions using asymmetric splitting do result in an equivalent split attained using a triple splitting mode.

3. An apparatus for coding a block of video data, comprising:
   a memory, and
   a processor, configured to:
   divide said block into at least two rectangular sub-blocks by using binary or triple splits such that successive binary splits are not used if the successive binary splits result in an equivalent triple split, and
   encode each sub-block using processing such that a transform that corresponds to each sub-block size is used,
   wherein said dividing comprises:
      splitting said block into at least two rectangular sub-blocks using horizontal or vertical divisions, when successive divisions using asymmetric splitting do not result in an equivalent split attained using a triple splitting mode, and wherein splitting comprises binary symmetric splits, one-fourth and three-fourths splits, one-third and two-third splits, and triple splits, wherein any of the splits can be in a horizontal or vertical direction, and
      splitting said block into at least two rectangular sub-blocks using a triple splitting mode instead of said asymmetric splitting, when said successive asymmetric divisions using asymmetric splitting do result in an equivalent split attained using a triple splitting mode.

4. An apparatus for decoding a block of video data, comprising:
   a memory, and
   a processor, configured to:
   decode at least one sub-block of a plurality of sub-blocks that comprise said block, using processing such that a transform that corresponds to each sub-block size is used, and
   reassemble the plurality of sub-blocks into said block, wherein reassembling comprises an inverse operation of dividing the block by using binary or triple splits such that successive binary splits are not used if the successive binary splits result in an equivalent triple split,
   wherein said dividing comprises:
      splitting said block into at least two rectangular sub-blocks using horizontal or vertical divisions, when successive divisions using asymmetric splitting do not result in an equivalent split attained using a triple splitting mode, and wherein splitting comprises binary symmetric splits, one-fourth and three-fourths splits, one-third and two-third splits, and triple splits, wherein any of the splits can be in a horizontal or vertical direction, and splitting said block into at least two rectangular sub-blocks using a triple splitting mode instead of said asymmetric splitting, when said successive asymmetric divisions using asymmetric splitting do result in an equivalent split attained using a triple splitting mode.

5. The method of claim 1, wherein said dividing comprises:

using a one-third and two-thirds division with another binary division that does not result in a division that can be performed using a triple split.

6. The method of claim 5, wherein a first division is a one-fourth and three-fourths division, and a second division is a one-third and two-thirds division.

7. The method of claim 5, wherein said second division occurs after an intermediate division occurring after said first division.

8. The method of claim 2, wherein said dividing comprises:

splitting said block into at least two rectangular sub-blocks, when successive divisions using asymmetric splitting do not result in an equivalent split attained using a triple splitting mode, and wherein splitting comprises binary symmetric splits, one-fourth and three-fourths splits, one-third and two-third splits, and triple splits, wherein any of the splits can be in any direction, and splitting said block into at least two rectangular sub-blocks using a triple splitting mode instead of said asymmetric splitting, when said successive asymmetric divisions using asymmetric splitting do result in an equivalent split attained using a triple splitting mode.

9. The method of claim 2, wherein a mode representative of said a division is signaled.

10. A non-transitory computer readable medium containing data content generated according to the method of claim 1 for playback using a processor.

11. A non-transitory computer-readable medium storing data comprising instructions which, when the program is executed by a computer, cause the computer to carry out the method of claim 2.

12. The apparatus of claim 3, wherein said dividing comprises:

using a one-third and two-thirds division with another binary division that does not result in a division that can be performed using a triple split.

13. The apparatus of claim 12, wherein a first division is a one-fourth and three-fourths division, and a second division is a one-third and two-thirds division.

14. The apparatus of claim 12, wherein said second division occurs after an intermediate division occurring after said first division.

15. The apparatus of claim 3, wherein a mode representative of said a division is signaled.

16. The apparatus of claim 4, wherein said dividing comprises:

splitting said block into at least two rectangular sub-blocks, when successive divisions using asymmetric splitting do not result in an equivalent split attained using a triple splitting mode, and wherein splitting comprises binary symmetric splits, one-fourth and three-fourths splits, one-third and two-third splits, and triple splits, wherein any of the splits can be in any direction, and splitting said block into at least two rectangular sub-blocks using a triple splitting mode instead of said asymmetric splitting, when said successive asymmetric divisions using asymmetric splitting do result in an equivalent split attained using a triple splitting mode.

* * * * *